Jan. 5, 1971    S. FEIN ET AL    3,552,169
SPRING END FINISHING

Filed March 15, 1968    11 Sheets-Sheet 1

INVENTORS
Samuel Fein & Regis A. Vey
BY
ATTORNEY

INVENTORS
Samuel Fein & Regis A. Vey
BY
ATTORNEY

Jan. 5, 1971  S. FEIN ET AL  3,552,169
SPRING END FINISHING
Filed March 15, 1968  11 Sheets-Sheet 4
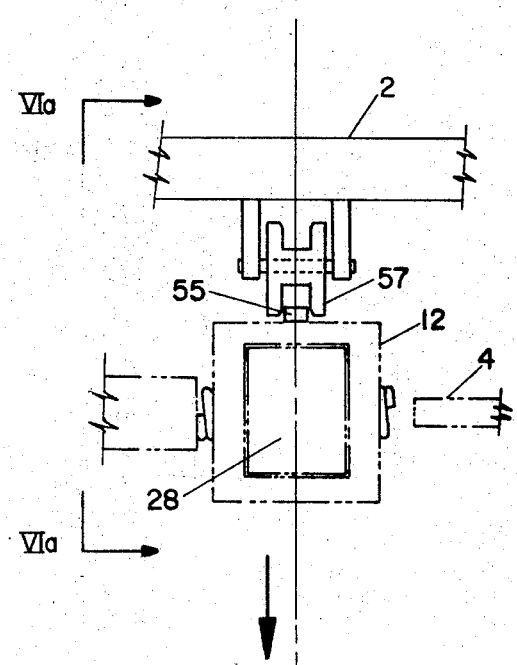
FIG. 6
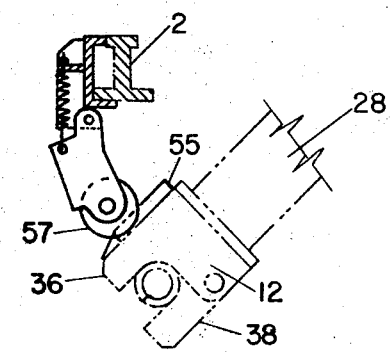
FIG. 6a
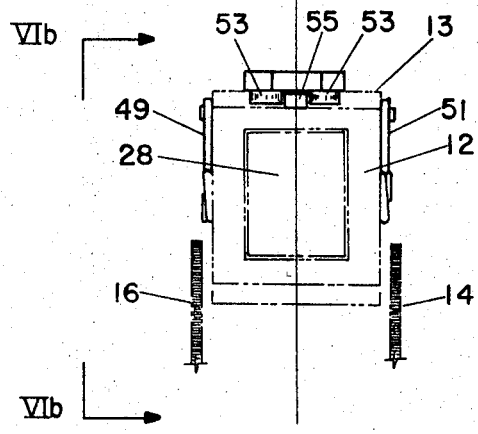
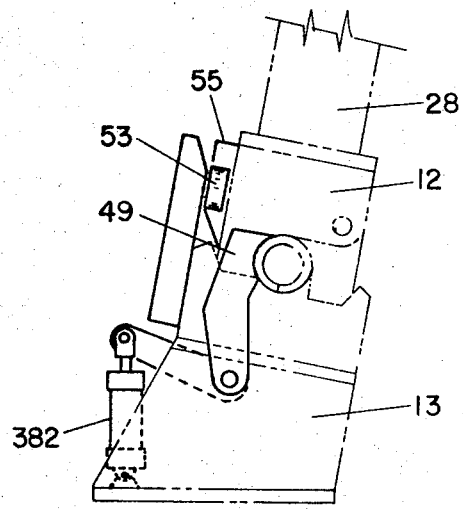
FIG. 6b
INVENTORS
Samuel Fein & Regis A. Vey
BY
ATTORNEY

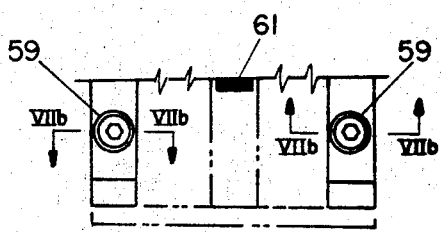
FIG. 7a
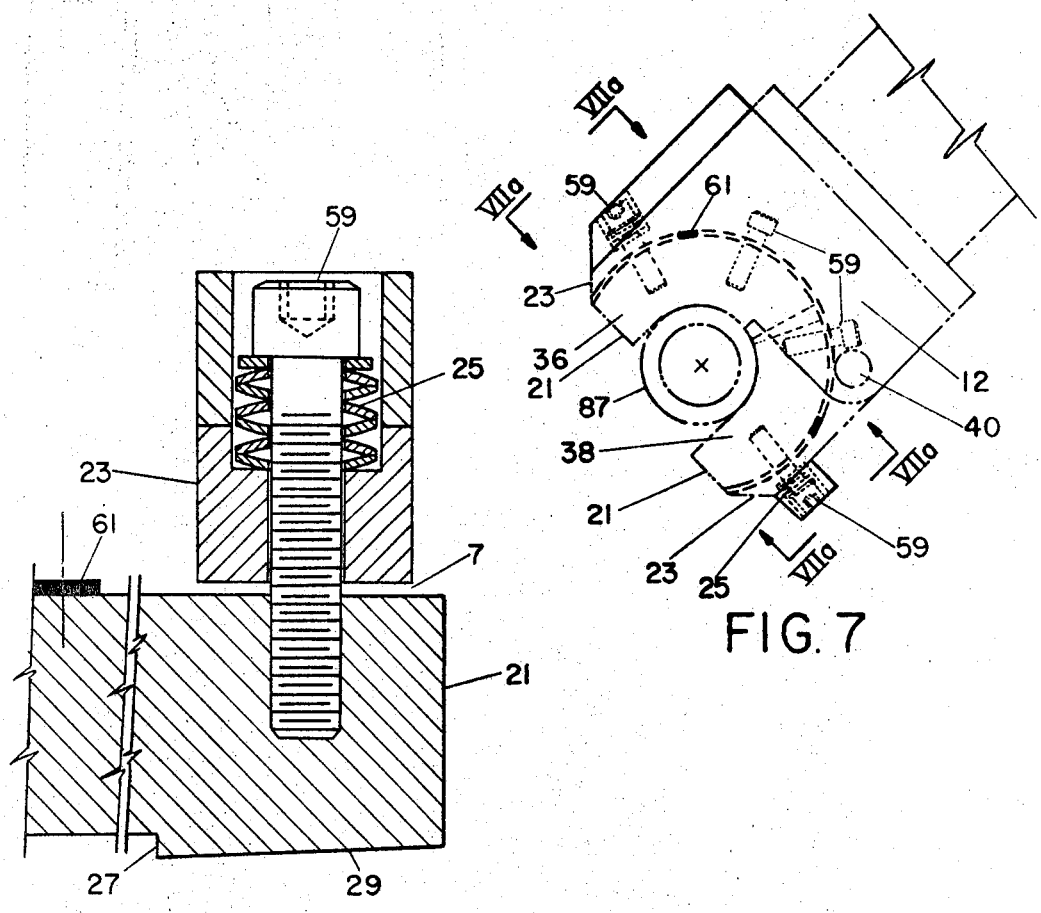
FIG. 7b
FIG. 7
INVENTORS
Samuel Fein & Regis A. Vey
BY
ATTORNEY

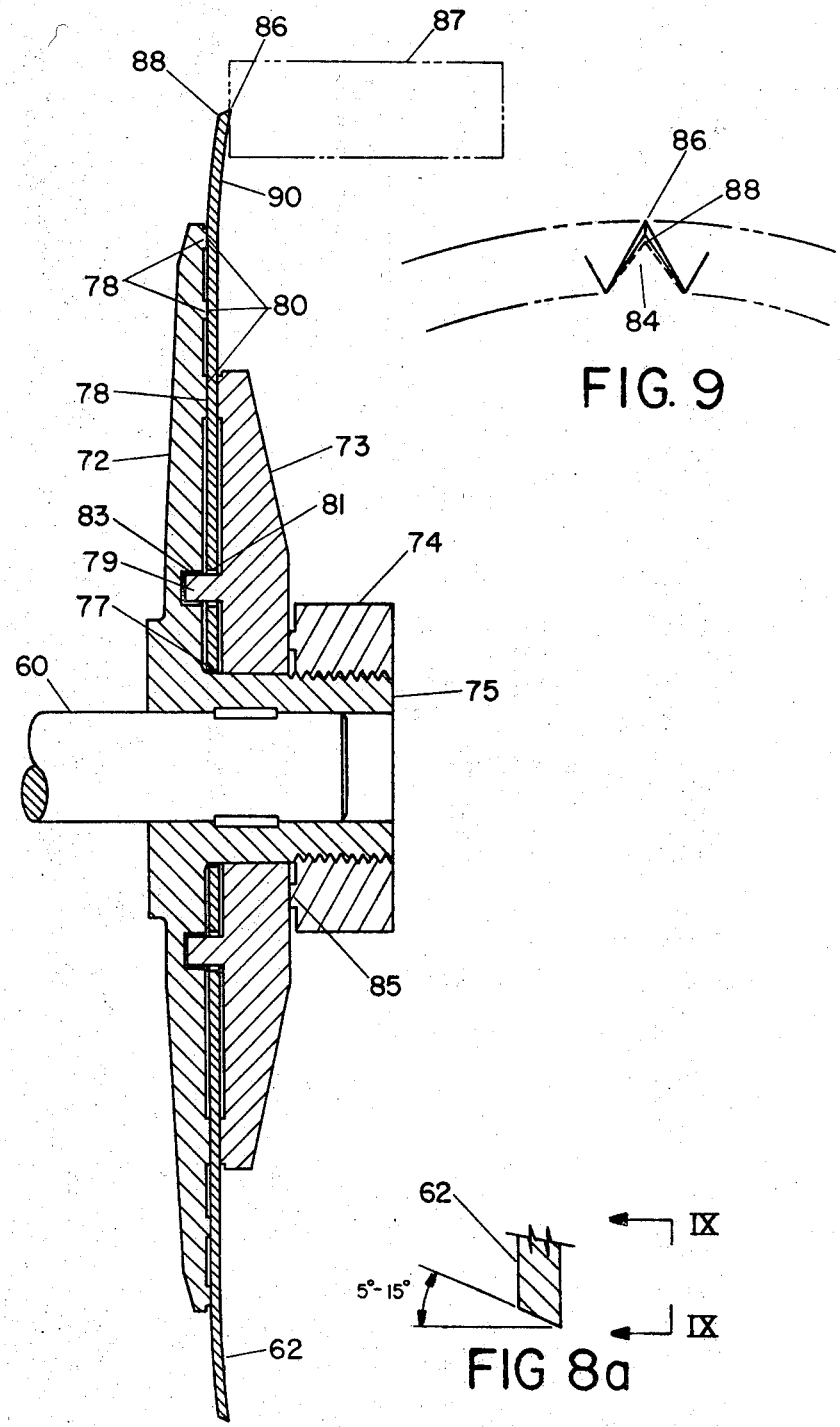

INVENTORS
Samuel Fein & Regis A. Vey
ATTORNEY

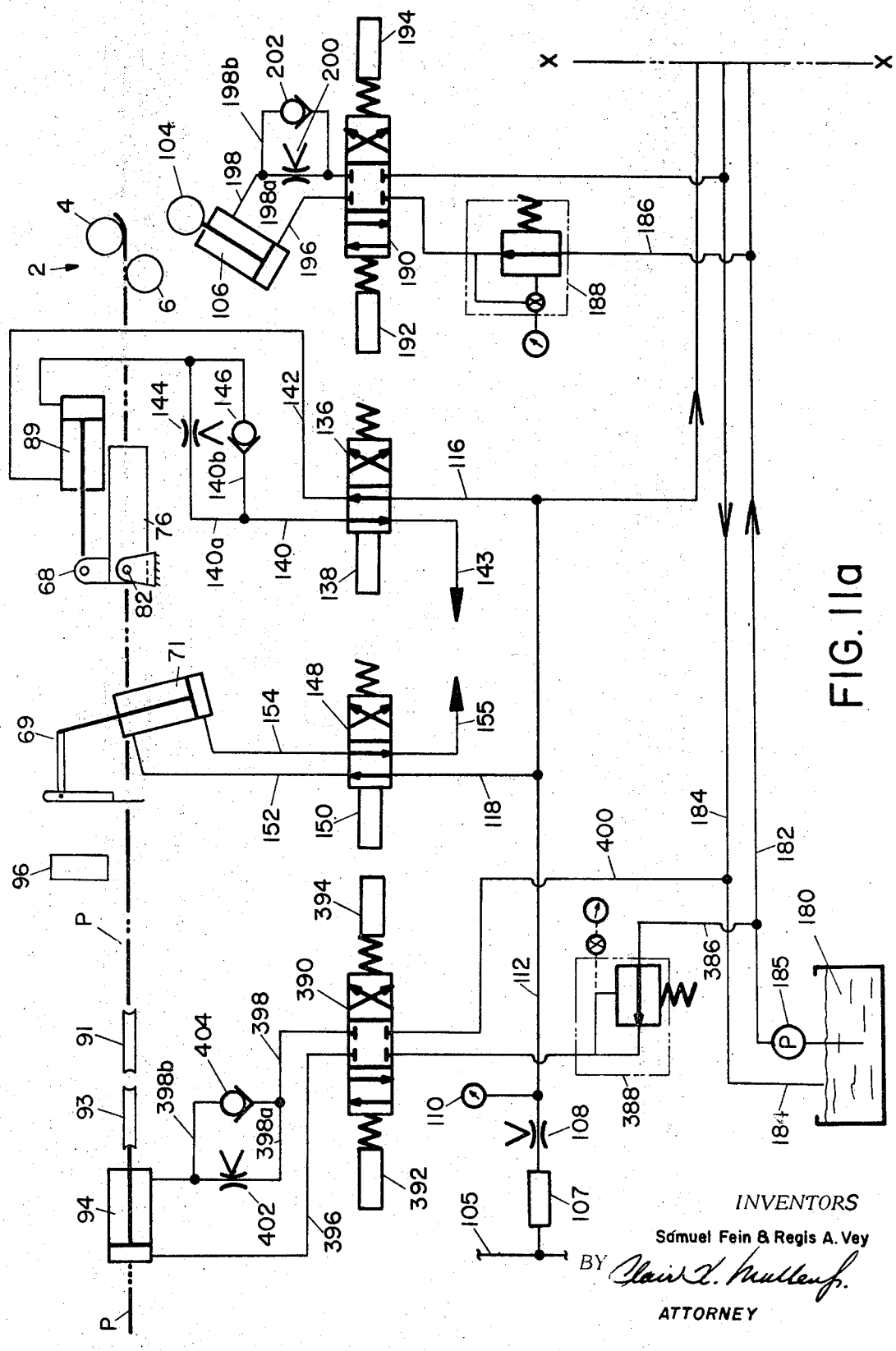

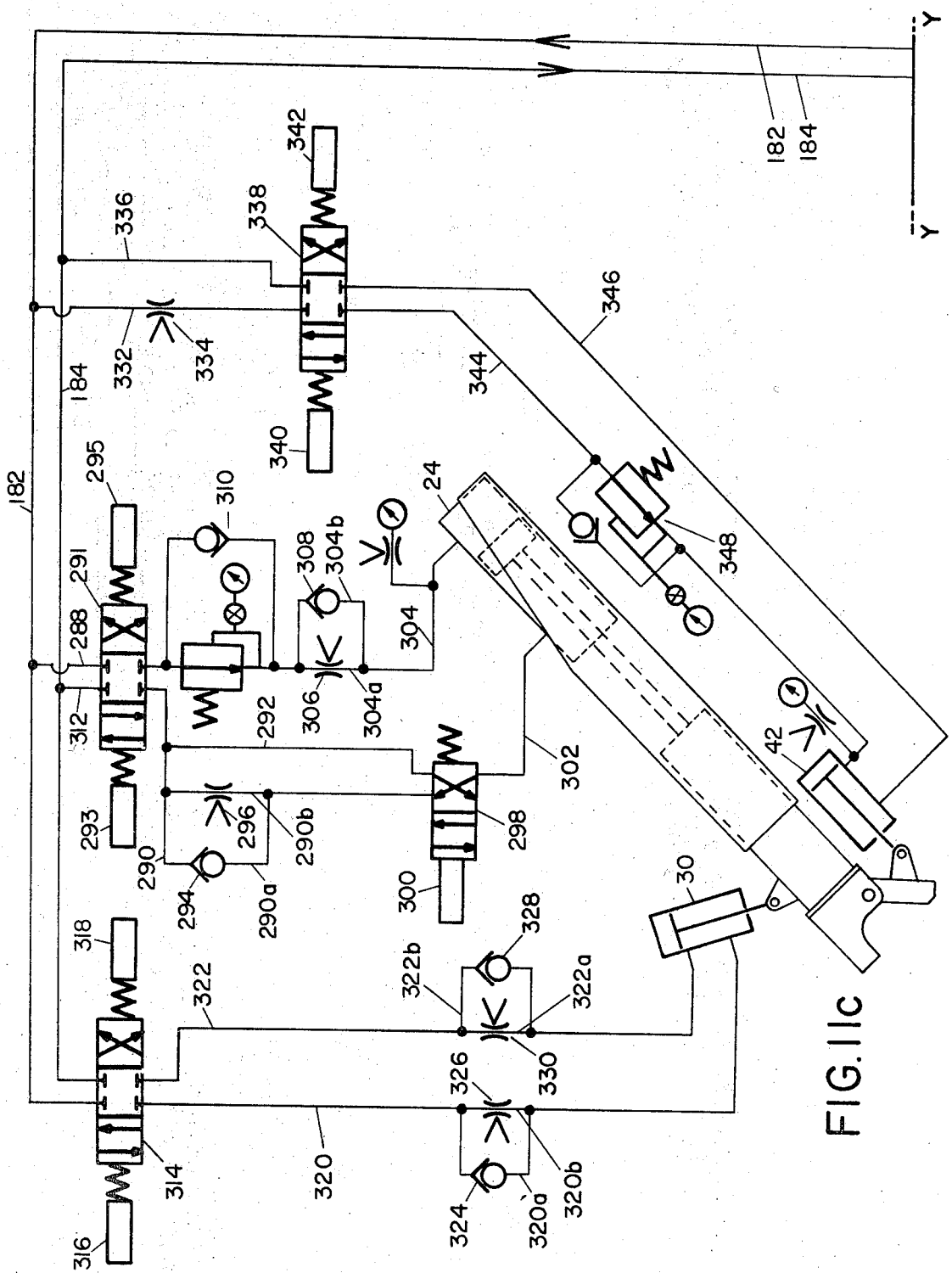

INVENTORS
Samuel Fein & Regis A. Vey
ATTORNEY

United States Patent Office 3,552,169
Patented Jan. 5, 1971

3,552,169
SPRING END FINISHING
Samuel Fein, Irwin, and Regis A. Vey, Ben Avon, Pa., assignors to Crucible Steel Company of America, Pittsburgh, Pa., a corporation of New Jersey
Filed Mar. 15, 1968, Ser. No. 716,277
Int. Cl. B21f 11/00
U.S. Cl. 72—129                                    9 Claims

ABSTRACT OF THE DISCLOSURE

This patent discloses machinery for finishing the end bearing surfaces of railway freight car truck springs. In making such springs, it has hitherto been conventional to taper the ends of the bars from which the springs are made as a separate operation, prior to heating the tapered-end bars to a coiling temperature and coiling them to form the springs. In accordance with the invention, the end-tapering operation is omitted, yet railway truck springs having good end bearing surfaces are obtained, this being done by the use of the machinery of the instant invention, which comprises equipment for simultaneously hot-machining opposite ends of a coiled, untapered spring bar. Grinding or sawing may be used. Apparatus for practicing the invention comprises means for removing the coiled spring bar from the mandrel upon which it is coiled, means for supporting the coil during the hot-machining operation, and means for finishing the coil ends, to leave flat bearing surfaces thereon. The equipment for controlling the operation of the spring end finishing machine of the invention to render it automatic is described. Superior properties of springs so made are indicated.

BACKGROUND OF THE INVENTION (1) Field of the invention

This invention relates to the manufacture of railway truck springs and the like, and in particular to machinery for finishing the ends of such truck springs to provide bearing surfaces thereon. In another aspect, the invention relates to a method for the manufacture of such springs having the feature that the step of tapering the ends of the spring bars prior to coiling is omitted. The invention further relates to springs so made as articles of manufacture.

(2) Description of the prior art

Truck springs for railway cars are well known. These are large, heavy-duty springs, made by coiling a bar ranging in diameter from about $7/16$ inch to $1\frac{1}{2}$ inches and in length from about 67 inches to 98 inches. The springs are often used in sets of two, an outer and an inner of about the same free-standing height but coiled in opposite senses. For a class D-2 outer spring, for example, there is used a bar $17/32$ inches in diameter and 71 inches long, and for a class D-2 inner spring, there is used a bar of $11/16$ inch in diameter and 67 inches long.

The practices used in forming such springs have changed little since the turn of the century. One end of a blunt sheared bar is heated red-hot, about 1800–1900° F., and pushed between tapering rolls having rotating eccentric dies that engage the hot end and form it into a tapered, wedge-like shape as the bar is pushed out of the rolls toward the operator. Immediately thereafter, the operator positions the newly formed end between squeezer jaws that impart a slight taper at right angles to the previously formed taper, thereby reducing the spread-out of metal caused by the prior wedge-shaping operation. The wedge-shaping and squeezing operations are repeated as many times as necessary, for example, about three times, in order to produce a good tapered end. The same procedure is used to shape the other end of the bar. The entire bar is then heated red-hot and is then coiled on a tapered, generally cylindrical mandrel to form helical springs. During the coiling operation, the operator turns or twists the trailing end of the hot spring bar to a position that is intended to give a flat end bearing surface upon completion of the coiling operation, but sometimes he twists too much or too little, and scrap losses result. The hot spring is then stripped from the mandrel and is immediately quenched into a bath of oil. When its temperature has dropped to between 175–300° F., the spring is removed from the oil and is then tempered, shot-peened, inspected and otherwise prepared for shipment. A small but substantial portion of springs made by the above-described method do not pass inspection because of malformation of their ends, resulting in their having poor end bearing surfaces; such springs, if not overly malformed, are ground, using an abrasive wheel, to improve or increase the bearing area to a minimum of about 210°, considering the entire circumference of the spring as 360°. This grinding may be done, for example, by placing six springs into a holder to support the central part of each spring so that its axis is positioned horizontally, and then moving grinding wheels in against the protruding ends of the springs. The grinding operation is a costly procedure, and it is accordingly an object of the invention to provide machinery that will finish the ends of the coiled springs in such fashion that need for the preliminary bar-tapping operation and the subsequent operation of grinding of malformed ends will be eliminated.

It is known, moreover, in the making of helical springs, to use untapered spring bars and obtain adequate end bearing surfaces by applying adapter plates to the springs after they are formed. However, the adapter plates constitute an added cost, and with this practice, the springs are sometimes subjected to localized forces of considerable severity that make them fail.

It is also known to practice a method of making railway truck springs in which, instead of using a spring bar of length appropriate for making just one spring, there is used a longer spring bar, capable of being formed into two or three or even more springs, the bar being heated red-hot, wound about a mandrel to produce a long spring, and then divided by hot sawing into appropriate individual spring lengths. This may be done after either clamping together certain parts of the spring in the vicinity of the places to be severed by sawing and then pulling on the long spring from its ends to expand the unclamped portions or, as an alternative, winding the long spring substantially more loosely so that the pitch throughout corresponds to that of the central portion of a finished spring, inserting spacers between the individual wraps in places where the larger pitch is to be retained, and then pushing in on the long spring from its ends to collapse the portions that do not contain the spacers and thus correspond to the vicinities of the spring ends, and then sawing. It is to be understood that a railway truck spring is not of the same pitch throughout, but is rather somewhat more closely wrapped in the vicinity of its ends. There is also the practice of merely using a suitable lead screw in the coiling machine to give a desired compound winding, i.e., one with suitable more loosely and more tightly wound portions, and then severing such a long spring into appropriate segments. The practices mentioned above are taught in U.S. Pats. Nos. 716,679, 716,680, 791,752 and 791,753. These practices are to be distinguished from the present invention in that the latter specifically involves rapidly removing metal simultaneously from both ends of a red-hot coiled spring bar, it not being practical to finish the ends of the spring in this way unless the operation is completed in a very short time such as about two or three seconds. Otherwise, economical production rates cannot be maintained. The above-mentioned patents have further shortcomings as references against the instant invention. Finishing the ends of railway truck springs by hot sawing involves problems that are not even mentioned in the above patents, let alone solved thereby.

The foremost difficulty is that it is hard to obtain good, planar surfaces on the ends of the spring. Customer specifications require that, when stood on their ends, the springs do not deviate from the vertical by more than two or three degrees. In attempting to conduct hot sawing at a rate such that economical production rates can be maintained, such as about four springs per minute or more, there must be used large blades, such as about 24 inches in diameter or larger, and high saw surface speeds, on the order of 12,000 to 30,000 surface feet per minute. This, in turn, requires high saw rotational speeds, on the order of 1000 to 4000 revolutions per minute. In such circumstances, it is understandably difficult to control the location of the working edge of the saw within several thousandths of an inch, but this is required in order to obtain good, planar cuts of the kind that are required in order that the present invention may be satisfactorily practiced. The saw moves, and so does the spring, even if it is rigidly supported. Moreover, as the saw passes through different parts of the spring, the amount of metal that is removed at a given traverse rate changes substantially, and undue variations in saw speed, power requirements, and forces on the saw may result if means are not provided to adjust the rate at which the saw moves through the spring in such manner that these variations are minimized. The broad concept of working simultaneously by hot sawing or other metal-removing operation on both ends of a coiled spring bar, as a way of maintaining production rates sufficiently high as to be economical and avoiding the problems that would be associated with accurately positioning the work twice, rather than once, as would be required if but a single metal-removal means were to be employed, is not disclosed in the above-mentioned patents, nor elsewhere in the prior art.

The above-mentioned patents take no account of the consideration that the spring must be held as steady as possible during the hot-sawing operation, they do not suggest a satisfactory way for doing this, and they overlook the fact that, even when this is done, the spring will move during the hot-sawing operation, raising a question whether even with such steady support for the spring, hot sawing or any other sort of hot machining, as a means of finishing spring ends of railway truck springs, can be done in such manner that end cuts of adequate squareness can be produced at production rates sufficiently high that the process remains economical.

It would seem that the finished springs produced by the methods of the above-mentioned patents would have ends with good, flat bearing surfaces as a result of the patentees' sawing operation, and that as a consequence, there would be no invention in articles made in accordance with the method and with the use of the apparatus of the instant invention, but such is not the case. Springs made in accordance with the practice of the above-mentioned patents have an end bearing surface as high as about 360° and, consequently, a feather edge at the end of each spring; it is apparent to those skilled in the art that springs sawed in this manner would crack in the feather edge during the immediately following quenching operation. The prior art lacks, moreover, any teachings that a substantial improvement in service life, perhaps to the extent of two or three times that obtained with conventional springs with forged tapered ends, can be obtained with single-length springs end-finished in accordance with the instant invention.

The prevalence today of a practice wherein railway truck springs are made by taking individual-length spring bars, first heating and tapering the ends thereof as a separate operation, and then heating the bars throughout their lengths and coiling them about a mandrel—i.e., substantially the practice disclosed as prior art in the above-mentioned Daniels et al., patent issued in 1902—suggests that the above patents do not make it obvious to overcome the problems that the present invention solves in the manner herein taught.

It is known, moreover, to remove ends from railway truck springs by cold sawing, but this practice is obviously undesirable because the spring so handled needs to be heat-treated again before it can be put into service; otherwise, it is not of uniform properties throughout, owing to the different thermal history of the vicinity of the cut ends. In order for the machining to be done at a rate sufficiently fast to maintain an economical production rate friction sawing, abrasive sawing, friction machining, or grinding must be used, i.e., machining of the kind that produces a swarf at a minimum temperature of about 1800° F. in the vicinity of the cut, rather than mere mechanical sawing of the kind that is done with a conventional low-speed band saw. Production rates with mere mechanical sawing are entirely too low. The expense of heat treating after cold sawing is also sufficiently high to make cold sawing uneconomical.

In summary, it can be said that the prior art does not provide any teachings, in the light of which it would be obvious to practice the instant invention, as more fully describe hereinbelow.

BRIEF SUMMARY OF THE INVENTION

In its broadest aspect, the present invention comprises apparatus for economically finishing the ends of railway truck springs that comprises means for holding steady a coiled, red-hot spring bar and fast-acting means for machining substantially planar cuts on the ends thereof perpendicular to the axis of the spring, with the fast-acting machining means producing a swarf at minimum temperature of about 1800° F. In its apparatus aspects, the invention is further characterized by certain additional features. The means for holding steady the coil during the hot metal-removal operation advantageously comprises not only an anvil but also a pair of gripping jaws, one fixed and one movable, situated at the distal end of a transfer boom arranged for movement to convey the coil from the mandrel upon which it is formed to the anvil; this contributes to obtaining, with a high production rate, accurate placement of the coil to be cut. Another feature is that the movable one of said jaws can be moved not only out and in, to grasp the coil, but also has parts that are resiliently supported in such manner as to conform the interior of the movable jaw to the taper of the coil formed on the mandrel and accommodate for small variations in coiled spring diameter. The coil taper varies somewhat from one coil to the next for various reasons, including unavoidable variations in diameter of the bar, etc.

The resiliently supported parts that come into contact with the spring are slightly tapered so as to bear a part of the forces of reaction exerted by the saw blade or grinding wheel upon the coil spring during the metal-removal operation. The anvil is preferably provided with fingers or other suitable support means that project into the coil in the vicinity of its end turns and serve also to bear some of the same reaction forces, decreasing the tendency of the coiled spring to be compressed thereby and thus have nonplanar end bearing surfaces. The coil-grasping jaws are also preferably provided with positioning means, such as a lug, cooperating with guide means both when the jaws engage the coiled spring on the mandrel and when the jaws place the coiled spring on the anvil, to avoid the inaccuracies that might result if the transfer boom were not so guided. Another apparatus feature is that the means for moving the metal-removal means with respect to work provides for different rates of travel of said means with respect to the coil as the machining progresses, e.g., from a fully retracted position rapidly forward to a point nearer where contact is made with the work, then forward a short distance at a very slow speed, then forward a substantial further distance at a greater rate of speed, then further forward at a slower rate of speed, until the machining is completed. In accordance with another feature, grinding is practiced instead of hot sawing, and the grinding wheel has a central portion that is recessed so as to remain out of contact with the work. Still other features relate to the design of the saw used in each hot-saw assembly and the way in which the saw is mounted to its shaft. The angle of contact between a saw tooth and the work is not perpendicular, but rather leads by about 15–30°, or possibly at little less if coarser teeth and/or deeper roots are used; this leading effect may be obtained by using V-shaped saw teeth or in other ways known to those skilled in the art. A saw is used having a slightly greater diameter on the edge nearest the bulk of the spring to be cut than on the other edge, such that the peak of each tooth is chamfered at about an angle of 5° with respect to the saw shaft; a relieved portion in the vicinity of the edge of the saw on the side toward the work is provided; a saw blade of substantial thickness such as about 5/16 inch is used; and flanges are used that are of special design to oppose the tendency of the saw blade to flex during a cutting operation. The special design of the flanges comprises the features that, in place of the conventional feather-edged squat cone, there is provided on each side of the saw blade a flange, generally conical, that has at least one ring on the base of the cone with a tapered surface for contacting the saw blade, a hydraulic nut being used to force such flanges against each saw blade to as to prestress it.

In its method aspects, the invention comprises an economical way of end-finishing railway truck springs whereby an initial tapering operation is avoided, and it comprises the steps of coiling an untapered spring about a mandrel, removing said coiled spring from said mandrel, holding the coiled spring steady, and while said spring is substantially red-hot, i.e., at a temperature in the range of about 1500° F.–1800° F., removing metal from the ends thereof simultaneously to produce thereon substantially planar surfaces that are perpendicular to the axis of the spring. To be more scientific, the temperature of the metal during the end finishing operation must be high enough that the spring will not cool below the upper critical temperature of the steel before it is quenched (typically, for example, about 1375° F.) and must also not be so high that any substantial grain coarsening results. Grain coarsening is dependent upon time at temperature; it is desirable to avoid using temperatures over 1800° F., and grain coarsening may occur in minutes or less at temperatures as high as about 1900° F. Fast-acting metal-removing means are used that produce a swarf having a minimum temperature of 1800° F. A further method feature is that the metal-removal step is done by grinding, preferably using a wheel with a central portion so recessed as to remain out of contact with the work. A further method feature is that the metal-removal is done by hot sawing or grinding, and the metal-removal means is moved with respect to the coil at different rates of travel, as explained above.

The present invention further comprises, as articles of manufacture, railway truck springs end-finished by removal of metal from the ends of a coiled, red-hot untapered spring bar to obtain substantially planar end surfaces substantially perpendicular to the axis of the spring, the bearing surface of said spring extending for about 210°–310° about the circumference of each end of said spring. Such springs are characterized by the advantageous property of longer service life, a life in a cyclic fatigue test two to three times that of a conventionally produced forged-end railway truck spring having been observed.

BRIEF DESCRIPTION OF THE DRAWINGS

A complete understanding of the instant invention may be obtained from the foregoing and following description, taken together with the drawings, in which:

FIGS. 6, 6a and 6b are schematic elevation views of a portion of the apparatus of the invention, illustrating the grinding of a spring in its transfer from mandrel to anvil, FIGS. 6a and 6b being taken on the lines VIa—VIa and VIb—VIb in FIG. 6, respectively;

FIG. 7 is a detail elevation view of clamp means in accordance with the invention, and FIGS. 7a and 7b are views taken on the line VIIa—VIIa of FIG. 7 and on the line VIIb—VIIb of FIG. 7a, respectively;

FIGS. 8 and 8a are detailed elevation views of saw means used in accordance with the invention, FIG. 8a showing to an enlarged scale a detail of the saw means of FIG. 8, and FIG. 9 is a view taken on the line IX—IX of FIG. 8a;

FIG. 11 is a schematic showing of hydraulic and pneumatic control apparatus used in practicing the invention, the figure comprising three parts, FIGS. 11a, 11b and 11c, respectively, and forming a complete figure when FIGS. 11a and 11b are joined on the lines X—X each and FIGS. 11b and 11c are joined on the lines Y—Y of each.

DESCRIPTION OF THE PREFERRED EMBODIMENT

Figure 1:
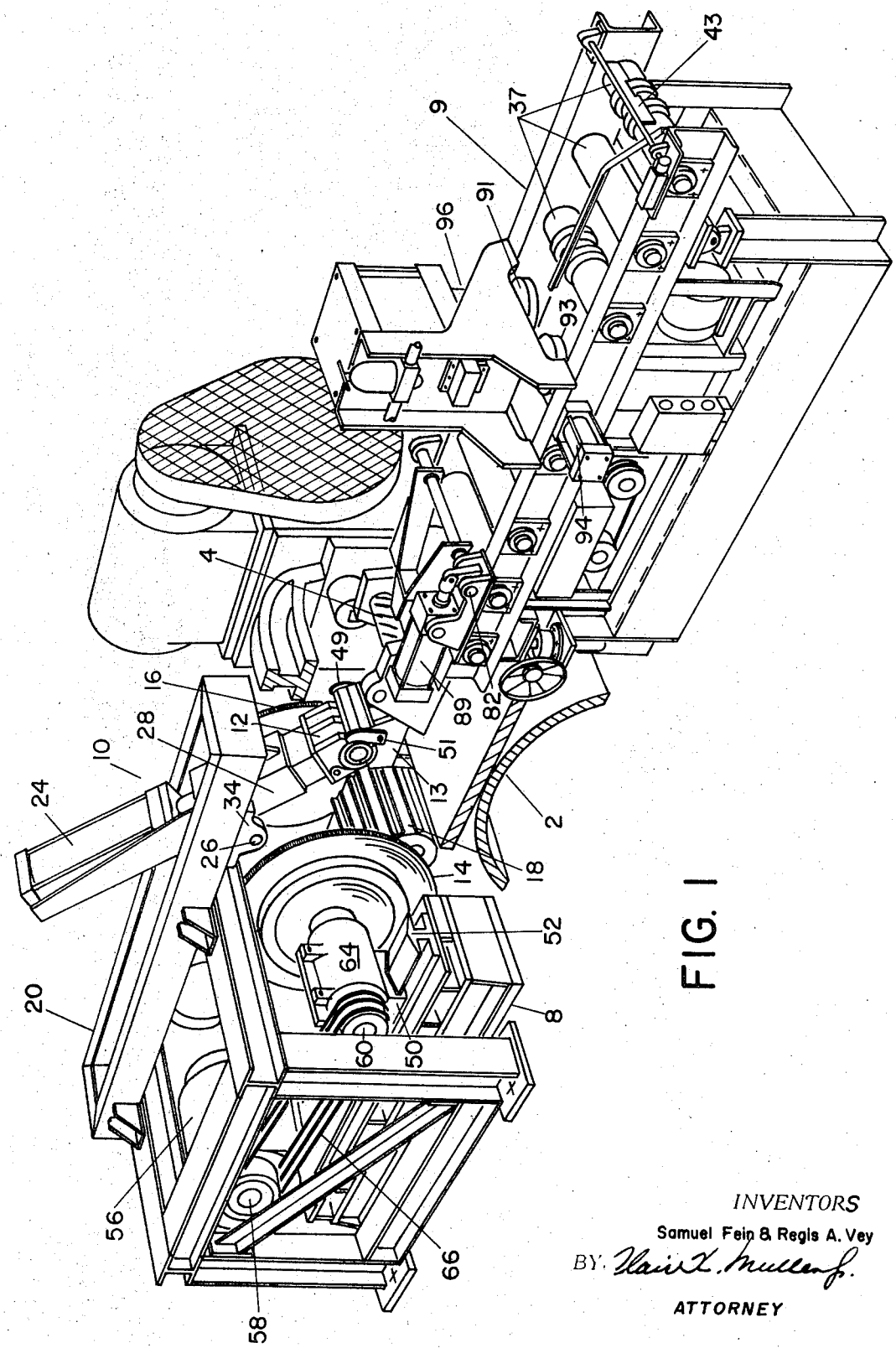
FIG. 1 is a perspective view, with certain parts broken away or omitted for clarity, of apparatus used in practicing the present invention.
Figure 3:
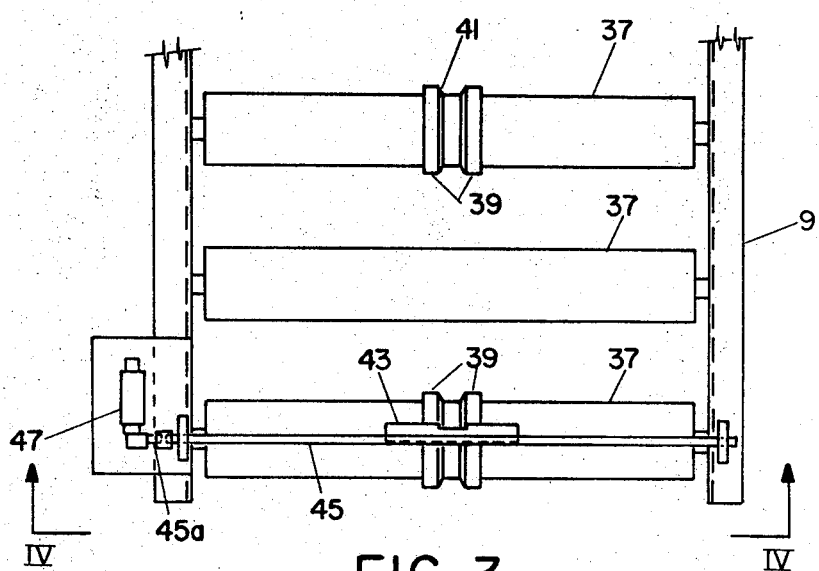
FIG. 3 is a plan view of a portion of the apparatus shown in FIG. 1.
Figure 4:
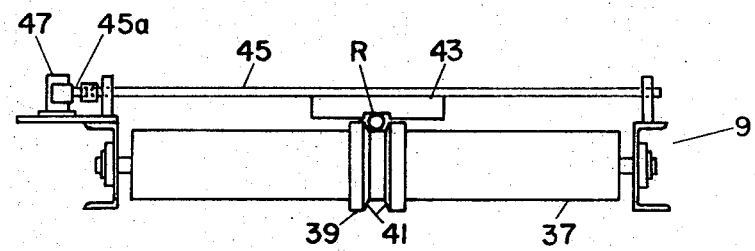
FIG. 4 is an elevation view, taken along the line IV—IV of FIG. 3.

As shown in the drawings, the spring-end finishing machine of the present invention is used with a coiler 2 which coils the red-hot bars about a mandrel 4 by the action of a lead screw 6 (hidden in FIG. 1, but indicated on FIG. 11a). Red-hot bars of steel are fed to the coiler 2 from a bar-heating furnace (not shown) by conveyor means including, if desired, a marker 96 and bar-positioning means 9, shown in greater detail in FIGS. 3 and 4. The apparatus of the instant invention comprises a base 8, a transfer means 10 having clamp means 12 for grasping the coil immediately after it is formed, an anvil 13 to which the coil is brought by the transfer means 10 and by which the coil is held during a subsequent hot-sawing or like operation, and a pair of metal-removing means 14 and 16, which in the disclosed embodiment are hot-sawing means. There is also provided a conveyor 18, by means of which the end-finished coils are removed to an oil-quench tank (not shown).

The base 8 is anchored to the floor and is preferably of heavy construction to reduce vibration. Minimizing vibration is an important consideration in obtaining good saw life and finish.

Figure 2:
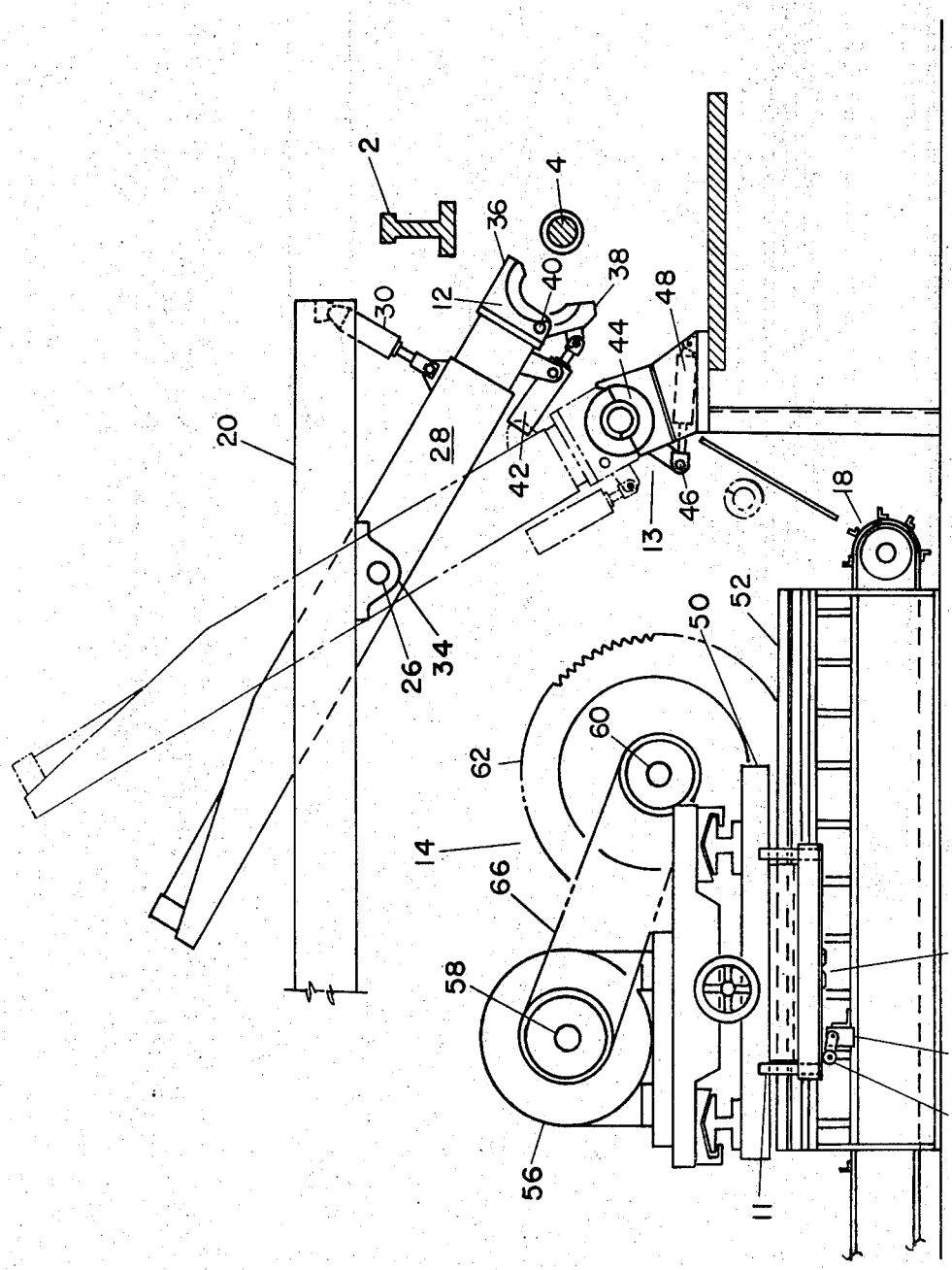
FIG. 2 is an elevation view, on an enlarged scale, of a portion of the apparatus shown in FIG. 1.

The transfer means 10 is mounted for movement toward and away from the coiler 12. In the embodiment shown, this is done by using a cylinder 24 to extend or retract the clamp means 12. A boom support 20 comprises also a pivot 26, about which the boom 28 may be turned by the action of a hydraulic cylinder 30 (see FIG. 2). As shown in FIG. 2, the pivot 26 engages bearings 34 of the boom or transfer apparatus 28. At the distal end of the boom 28 are the clamp means 12, comprising a fixed jaw 36, a movable jaw 38 supported for swiveling motion about a pivot 40, and a hydraulic cylinder 42 for opening and closing the jaws 36 and 38. It is quite desirable that the movable jaw 38 also be so constructed that it is free to move to accommodate coiled springs having different tapers and/or bar-stock diameters.

Machinery in accordance with the invention comprises suitable means for leading a red-hot untapered rod into the coiler 2. Though equipment of various kinds for this purpose will suggest itself to those skilled in the art, there may be conveniently used an arrangement such as that shown in FIGS. 3 and 4. There is provided a table consisting of a number of rollers 37, caused to rotate by suitable means (not shown). The rollers are provided with ribs or flanges 39 having tapered surfaces 41 that form a V-shaped opening within which a rod R is received and guided, the ribs 39 on rollers 37 being suitably aligned to convey the rod R in a straight pass line. To prevent feeding of two rods R at one time, there is also provided a flap 43 attached to a shaft 45, to which there is connected an arm 45a that will depress a switch 47 in the event that the flap 43 is activated, either by a rod R passing outside the ribs 39 or by two rods R attempting to pass simultaneously between the ribs 39.

Referring again to FIG. 2, the anvil 13 comprises a heavy casting having a V-shaped part 44 for receiving the coil and is mounted for motion about a pivot 46 by means of a pneumatic cylinder 48, to enable discharge of the finished work to the conveyor 18.

Another feature of the anvil 13 is that it has a pair of fingers 49 and 51 hydraulically operated as hereinafter more fully disclosed and best seen in FIGS. 1, 6 and 11, which support the end turns of the coiled spring against compressive reaction forces during the metal-removal operation. The exterior surfaces of the fingers 49 and 51, i.e., the surfaces facing the ends of the spring being finished, are tapered helically with a pitch substantially equal to that of the turn of the spring upon which they bear when in use; so that the compressive reaction forces produce a minimum of distortion of the spring ends before they find support against the fingers 49 and 51. The fingers 49 and 51 play an important part in the machine, for without them or some equivalent means of supporting the end turns of the spring against compressive reaction forces during finishing, it would be difficult to produce satisfactory springs at a feasible production rate by grinding, and it would be impossible to do it by hot sawing.

Another feature of the anvil 13 is that it preferably has a pair of guide members 53 that cooperate with a lug 55 on the fixed jaw 36 for ensuring reproducible lateral positioning of the coil as it is set down upon the anvil 13. The guide members 53 are wedge-shaped and provide a V-shaped opening into which the lug 55 is brought to rest. The lug 55 also cooperates with similar guide members 57 positioned to control the lateral position of the clamp means 12 while it is grasping the coil when it is on the mandrel 4. This is best seen in FIG. 6.

The metal-removing means 14 and 16 are set upon a carriage 50, seen in FIGS. 1 and 2, which is mounted for motion toward and away from the work along a way 52 in the base 8 by suitable means (not shown), such as a hydraulic cylinder, there being mounted on the carriage 50 in each of the metal-removing means assemblies 14 and 16, a saw motor 56 driving a shaft 58, a second shaft 60 associated with a saw 62, a support 64 within which the shaft 60 is journaled, and a belt 66 or the like for transferring power from the motor 56 to the shaft 60. Saws of substantial size, about 25 to 36 inches in diameter or possibly more, are required. If grinding is used, grinding-wheel rings of about the same size are used.

Advantageously, to save space, the two metal-removing means 14 and 16 are mirror images of each other, and to save time, they operate simultaneously on both ends of the coiled spring. The means 14 and 16 are also preferably of heavy construction, to reduce vibration.

Also shown in FIG. 2 is a switch 3 and, connected to the carriage 50 by arms 11, a cam member 15, which is preferably replaceable with other cam members 15 of somewhat different shape, as will be apparent. As will later be described in greater detail, the switch 3 forms part of hydraulic equipment for regulating the rate of traverse of the saw toward the work, the switch having a cam follower 17 for engaging the cam member 15 and causing the switch 3 to pass greater or lesser flows of hydraulic fluid, in accordance with the position of the follower 17. Other means for this purpose will be apparent to those skilled in the art.

As shown in FIGS. 7, 7a and 7b, both the movable jaw 38 and the fixed jaw 36 of the clamp means 12 comprise an inner shell 21 and an outer shell 23, operating between which are a plurality of springs 25 in the nature of Belleville washers, which resist compression of the gap 7 between the shells 21, 23. Near the ends of the jaw are a pair of ribs 27, seen in FIG. 7b, having tapered surfaces 29 that contact the spring. The surfaces 29 face outwardly toward the ends of the coiled spring being grasped.

The Belleville-washer spring arrangement permits the clamp means 12 to adjust itself to railway truck springs of varying degrees of taper, as where the spring is made of rod stock that varies in diameter, etc. This is done by causing the inner shells 21 to rock about the pivot points 61. Each pivot point 61 has at least three screws 59 and springs 25 associated with it; in FIG. 7, the springs 25 have been omitted from two of the screws 59, in the interest of clarity of the showing.

In the use of a hot saw to obtain planar surfaces on the ends of a coiled railway truck spring, there is considerable difficulty in obtaining a satisfactory planar surface on each end of the spring. Both the spring and the saw blade tend to move laterally during the hot-sawing operation, and in accordance with the invention, several measures are taken to overcome this difficulty. It is to be understood that not all these measures may be required in a particular case, but it is preferred to practice all of them.

As best seen in FIGS. 8, 8a and 9, a saw 62 is secured to the shaft 60 by means of flanges 72 and 73 that are of generally conical shape and are held against the saw 62 by means of a hydraulic nut 74 threaded to a collar 75 that forms an extension of the flange 72 and passes through the central opening 77 of the saw blade 62. As shown, the flange 72 also has on the base of its cone a number of concentric rings 78 having tapered surfaces 80 that come into flush contact with the saw blade 62 when the above-mentioned hydraulic nut 74 is tightened. The flange 73 is of similar design, but smaller and without the collar. The flange 73 has projections 79 that pass through openings 81 in the saw 62 and are received in openings 83 in the flange 72. This ensures that the saw 62 and flanges 72 and 73 rotate together as a unit. The hydraulic nut 74 is provided with a ring 85 that improves its bearing upon the flange 73. The structure comprising nut 74, flanges 72 and 73, and saw 62 is keyed to the shaft 60. Both of the saws 62 are so constructed.

Details of the design of the saw blade 62 are also shown in FIGS. 8, 8a and 9. In FIG. 8, the curvature of the saw, as a result of forces placed on it by the flanges 72, 73 and nut 74, is shown, exaggerated for clarity. The saw blade is about 5/16 inch thick, and is bent by about 0.004 inch per inch of radius. As seen in FIG. 9, the teeth 84 of the saw are V-shaped, rather than having the leading edge of each tooth running radially of the saw. The saw blade 62 has a slightly greater diameter on the edge 86 nearest the bulk of the spring 87 to be cut, shown in dash-dot outline in FIG. 8, than on the other edge 88, such that the peak of each of the teeth 84 is chamfered at an angle of about 5° with respect to the saw shaft 60 (see FIG. 8a). The saw blade 62 is provided with relieved portions 90 in the vicinity of the circumference of the saw 62. The relief is about 0.004 to 0.007 inch per inch. The saw blade 62 is operated at high velocities, such as about 18,000 surface feet per minute or greater.

The equipment described above is operated as follows. As indicated above, a red-hot bar or rod R of steel from a bar-heating furnace (not shown) is fed to the coiler 2 by conveyor means including a bar-positioning means 9 and a marker 96. The lead end of the rod R is received in the coiler 2, which operates in a manner substantially conventional to form a spring coil about the mandrel 4 by the action of the lead screw 6 and knockdown roller 104. After a spring has been coiled on the coiler 2 about the mandrel 4, the transfer means 10 is manipulated so that the jaws 36 and 38 engage the coil. The mandrel 4 is retracted to free the coil, and the transfer means 10 is then manipulated to bring the coil within the V-shaped portion 44 of the anvil 13 with its end turns supported against reaction forces by the fingers 49 and 51. The coil remains grasped within the jaws 36 and 38 during the hot-sawing operation, which immediately follows. The carriages 50 that bear the saws 62 and the saw motors 56 start from a position remote from the coiler and are moved so that the saws 62 are brought toward them into engagement with the coil, removing therefrom an end portion to leave an end-finished spring with a good, flat bearing surface. The sawing operation must be completed rather quickly, taking no more than about one to three seconds, as otherwise production rates sufficiently high to be practical cannot be maintained. Moreover, if there is much delay, the springs will cool below a satisfactory temperature for quenching. After the sawing operation, the jaws 36 and 38 are opened, the boom is withdrawn, the carriage 50 is retracted, and the cylinder 48 is operated to spill the coil onto the conveyor 18, by which it is conveyed to an oil-quench tank. The remainder of the processing of the coil to make a railway truck spring ready for shipment is familiar to those skilled in the art.

Figure 10:
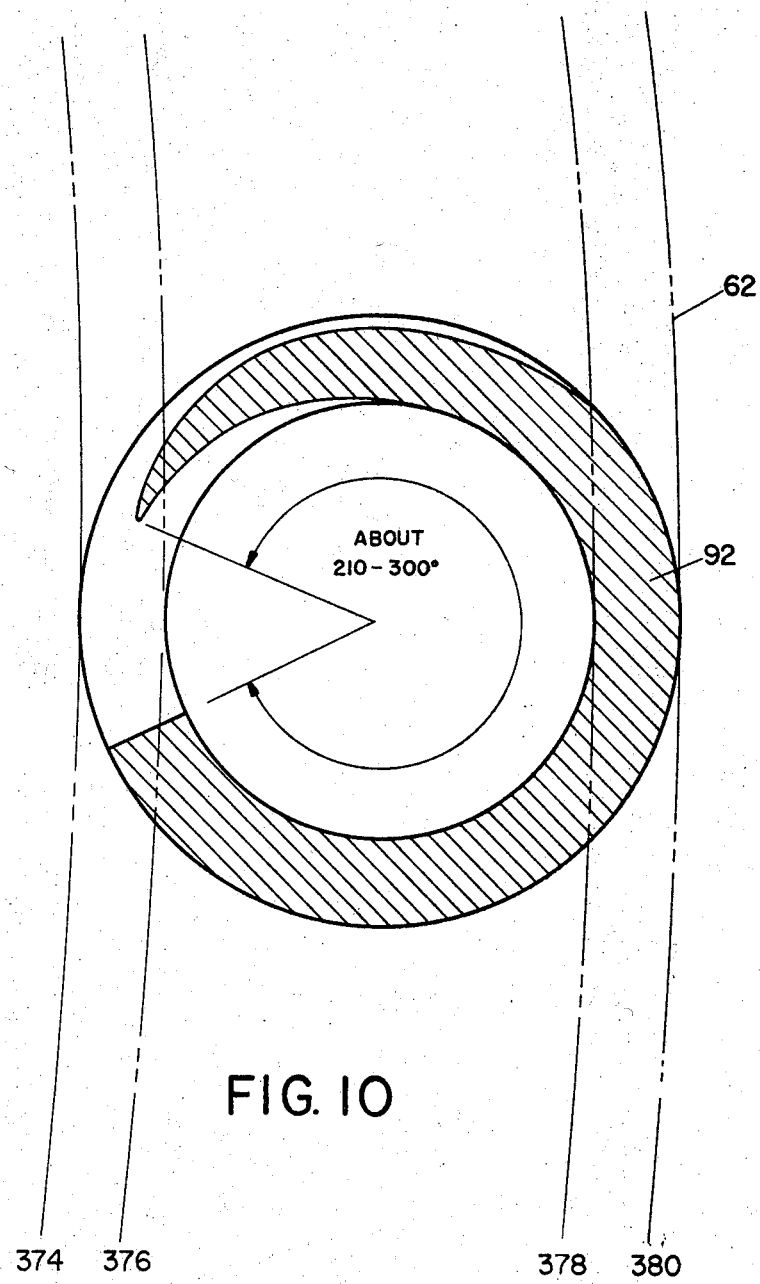
FIG. 10 is a schematic indication of the cross-sectional area of spring and contacted by a metal-removal means as it progresses therethrough.

The rate of travel of the saw through the work is preferably regulated so as to avoid large changes in the rate of metal removal. FIG. 10 shows the cut end 92 of a spring and indicates with dot-dash lines 374, 376, 378 and 380 the position of the saw blade 62 at different times in its motion toward and passage therethrough. Though it will in general be desirable to maintain the rate of metal removal substantially constant, other considerations will dictate the necessity of some compromise in this matter; for example, metal removal will desirably begin somewhat more slowly, to avoid the shock that would result from an initial metal-removal means traverse rate high enough to maintain a constant metal-removal rate throughout the operation. Various traverse-rate cycles may prove desirable with springs of different sizes or with the coiled spring oriented differently as it is held in the anvil 13. It will be apparent that the structure above described, using the replaceable cam member 15 and cooperating switch 3, may serve to vary appropriately the rate of traverse of the metal-removal means 14 and 16 with respect to the work. The retraction of the saw blade 62 may be done at any rate, but it will be advantageous to retract the saw blade as rapidly as possible so that the spring may be ejected from the position on the anvil 13 that it occupies during the end-finishing operation without danger of damage to the saw 62.

It will be apparent to those skilled in the art that the proper sequential operation of the various hydraulic cylinders mentioned above may be done by an operator, but that it may also be advantageous to provide automatic control means for performing the same function uniformly and efficiently. To that end, in the preferred embodiment of the invention there is provided such a system, which will be described briefly below in order that the best mode contemplated of practicing the invention may herein be set forth.

Figure 11B:
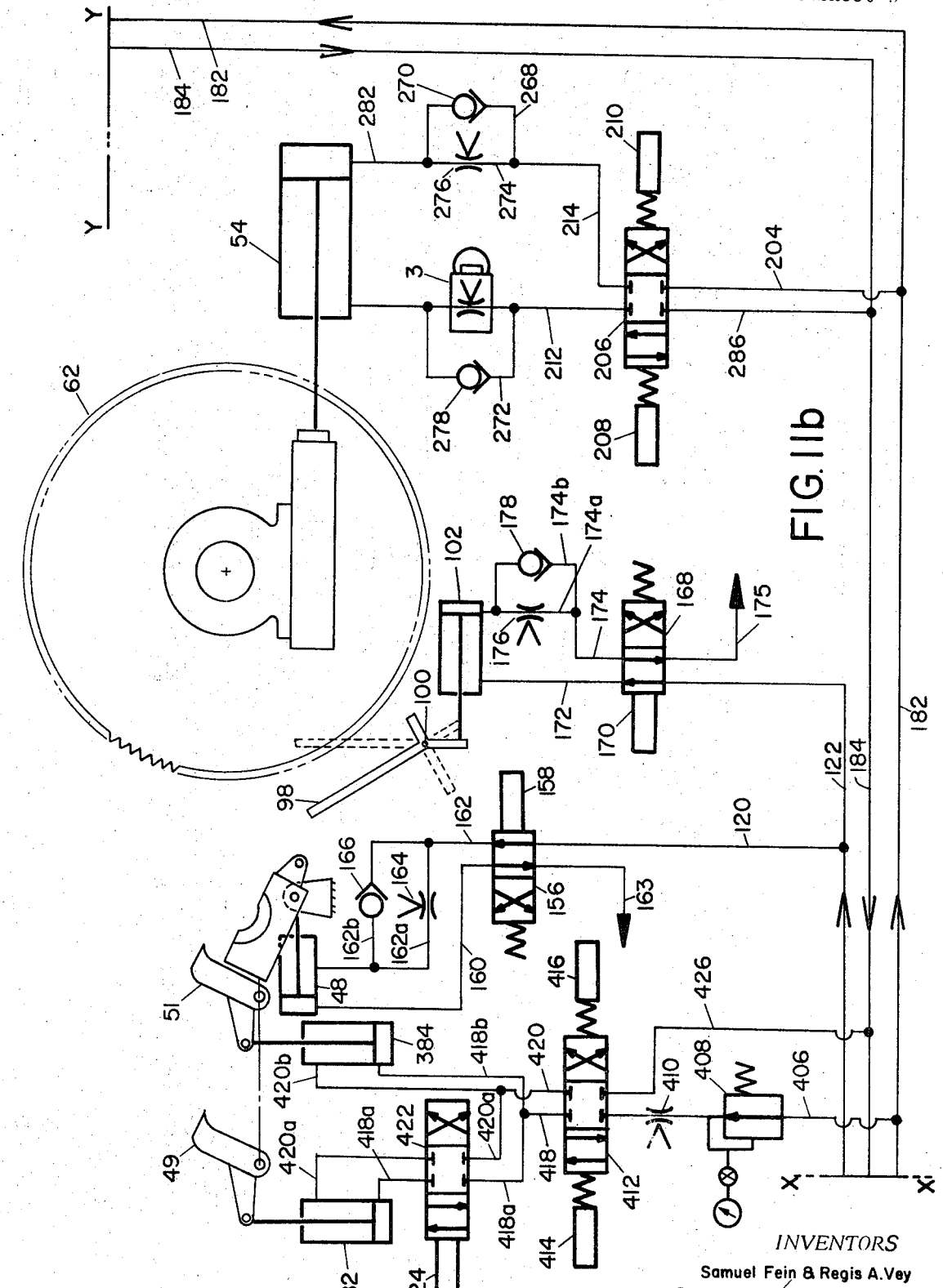

Reference will be made now to FIG. 11, of which there are three parts, designated FIGS. 11a, 11b and 11c, respectively, FIGS. 11a and 11b being joined on the lines X—X of each and FIGS. 11b and 11c being joined on the lines Y—Y of each. FIG. 11 is a schematic diagram indicating operative hydraulic and pneumatic connections, and in certain instances, parts therein have not been shown in proper perspective relationship to others of the parts shown. In FIG. 11, there are shown schematically, a guide fence 68, and a stop 69, associated with a pass line P through which spring bars are passed before being wrapped around the mandrel 4 of the coiler 2. Stop 69 is operated by a pneumatic cylinder 71. The guide fence 68 has leaf-spring arms 76 that are arranged to be movable about a pivot 82 by means of a pneumatic cylinder 89. Upstream of the guide fence 68 there are positioned pinch rolls 91 and 93, seen in proper perspective position in FIG. 1, the pinch roll 93 being movable into and out of contact with the work by means of a hydraulic cylinder 94. There is further provided a marker device 96 upstream of the stop 69. This may be of any known type, such as a roller having raised indicia on its exterior and capable of imprinting the work. There are also shown (see FIG. 11b) a reject chute 98 movable about a pivot 100 by means of a pneumatic cylinder 102, and a knockdown roll 104 (FIG. 11a) movable against the mandrel 4 by means of a hydraulic cylinder 106.

The above-mentioned pneumatic cylinders 89, 71, 48 and 102 are operated by means of a system comprising an air supply 105, filter 107, throttle 108, pressure gage 110, and pneumatic main 112, together with distribution lines 116, 118, 120 and 122 associated with the cylinders 89, 71, 48 and 102, respectively.

Associated with distribution line 116 there is a valve 136 operated by a solenoid 138, by means of which air pressure is communicated to one of the lines 140 and 142, which lead to opposite ends of the pneumatic cylinder 89, the other of said lines being connected to the vent 143. Line 140 contains parallel branches 140a and 140b which contain a throttle 144 and a check valve 146, respectively.

Associated with distribution line 118 there is a valve 148 operated by a solenoid 150, by means of which air pressure is provided to one of the two lines 152 and 154, which are connected to opposite ends of the penumatic cylinder 71, the other of said lines being connected to the vent 155.

Associated with distribution line 120 there is a valve 156 operated by a solenoid 158, by means of which air is supplied to one of the two lines 160 and 162, which lead to opposite ends of the pneumatic cylinder 48, the other of said lines being connected to the vent 163. Line 162 has parallel branches 162a and 162b, which contain a throttle 164 and a check valve 166, respectively.

Associated with distribution line 122 there is a valve 168 operated by a solenoid 170, by means of which air is supplied to one of the two lines 172 and 174 leading to opposite ends of the pneumatic cylinder 102, the other of said lines being connected to the vent 175. Line 174 has parallel branches 174a and 174b, which contain a throttle 176 and a check valve 178, respectively.

There is also provided, in accordance with the embodiment of the invention being herein disclosed, a hydraulic control system for operating the hydraulic cylinders 106, 24, 30, 42, 54, 94, 382 and 384. This system comprises a hydraulic fluid source 180, which is connected to a pressure main 182 and a return main 184. Pressure main 182 contains a pump means 185 including a suitable pressure regulator.

Connected to the main 182 is a distribution line 186, which contains a pressure regulator 188 and a valve 190, which is of the three-position type and is operated by two solenoids 192 and 194 so as to supply pressure to one of the lines 196 and 198, which are connected to opposite ends of the hydraulic cylinder 106. Line 198 has two branches 198a and 198b, which contain a throttle 200 and a check valve 202, respectively.

Also connected to the main 182 is a distribution line 204 containing a three-position valve 206 controlled by two solenoids 208 and 210, by means of which hydraulic pressure is communicated to one of the two lines 212 and 214. Line 212 communicates with one end of the cylinder 54 through the switch 3, which contains a cam follower 17 that contacts the cam member 15 (see FIG. 2) which controls the rate of advance of the saw blade 62. Line 212 has a branch 272 containing a check valve 278.

Line 214 communicates with the line 268 containing a check valve 270 and with a parallel line 274, line 274 containing a throttle 276, and the lines 272 and 274 joining to form a line 282, which communicates with the other end of said hydraulic cylinder 54.

There is further provided a line 286 communicating with return main 184.

For controlling the operation of hydraulic cylinder 24, shown in FIG. 11c, there is provided a system comprising distribution line 288, within which there is a three-position valve 291 controlled by solenoids 293 and 295. Line 288 communicates with two lines 290 and 292, line 290 containing parallel branches 290a and 290b which contain a check valve 294 and a throttle 296, respectively. Lines 290 and 292 communicate with a two-position valve 298, controlled by a solenoid 300, operable to connect one of the lines 290 or 292 with a line 302 connected to one side of the hydraulic cylinder 24.

Connected with the other side of the hydraulic cylinder 24 is a line 304 having branches 304a and 304b which contain a throttle 306 and a check valve 308, respectively. Line 304 also contains a pressure regulator 310, and then communicates via the valve 291 with a line 312 and the return main 184.

For controlling the operation of the hydraulic cylinder 30 that moves the transfer means about the pivot 26, the pressure main 182 and the return main 184 are connected with a system comprising a three-position valve 314 operated by solenoids 316 and 318, by means of which pressure in main 182 is communicated to one of the lines 320 or 322, which are connected to opposite ends of cylinder 30. Line 320 has two parallel branches 320a and 320b, which contain a check valve 324 and a throttle 326, respectively. Line 322 has two parallel branches 322b and 322a, which contain a check valve 328 and a throttle 330, respectively.

For controlling the action of hydraulic cylinder 42 which operates the movable jaw 38 of the clamp means 12, there is provided a system comprising distribution line 332, communicating with pressure main 182, and containing a throttle 334. Line 332 and a return line 336 are connected to a three-position valve 338 controlled by solenoids 340 and 342, so that pressure in line 332 may be communicated to one of the lines 344 and 346, both of which lines are connected to hydraulic cylinder 42, but at opposite ends thereof, the line 344 containing a pressure regulator 348.

For controlling the action of the hydraulic cylinder 94 that operates the pinch roll 93, there is provided a system shown in FIG. 11a and comprising distribution line 386, communicating with the pressure main 182 and containing a regulator 388, a three-position valve 390 controlled by solenoids 392 and 394, a pair of lines 396 and 398 leading to opposite ends of the cylinder 94, and a return line 400 leading from the valve 390 to the return line 184. Line 398 has parallel branches 398a and 398b, which contain a throttle 402 and a check valve 404, respectively. The valve 390 connects line 386 to one of the lines 396, 398 and the other of said lines to the return line 400, in accordance with the desired direction of motion of the pinch roll 93.

For controlling the action of the hydraulic cylinders 382 and 384 that operate the fingers 49, 51, there is provided a system shown in FIG. 11b and comprising distribution line 406, regulator 408, throttle 410, three-position valve 412 having two solenoids 414 and 416, lines 418 and 420, a further valve 422 having a manual switch 424, and a return line 426. The line 418 has branches 418a, 418b leading to one end of the cylinders 382 and 384, and the line 420 has branches 420a, 420b leading to the opposite ends of said cylinders. The switch 412 connects line 406 to one of the lines 418, 420 and the other of the lines 418, 420 to the return line 426, in accordance with the desired direction of movement of the fingers 49, 51, toward or away from the work. The switch 422 enables the fingers 49, 51 to be moved in opposite directions, if that is desired.

The apparatus described above may be operated as follows. A straight, red-hot spring bar issues from the bar-reheating furnace and is conveyed along the pass line P, traveling between the ribs 39 and thus being guided toward th coiler 2. As the bar passes an approach limit switch (not shown), in the vicinity of the marker 96, a clutch associated with the drive rolls of the roller table is disengaged, causing the bar to decelerate. At this time, the positive stop 69 is down, and by reason of the inertia of the rolls, the bar is conveyed forward smoothly against the stop 69, so that the end thereof is not deformed or mashed. Although this may be done in any of several ways, it is preferred that the marker 96 be at this time activated by means of a limit switch (not shown) associated with the positive stop 69. The marker 96 may, of course, be of any suitable construction, but it is preferred that the marker 96 include pressure-sensitive means associated with the marker roll thereof, connected in line with circuitry for performing the remainder of the functions of the handling of the red-hot spring bar between the reheating furnace and the coiler 2, so that marking and further processing is not done unless the marker roll is in engagement with the spring bar. It is also preferred, however, that the limit of downward travel of the marker be position-controlled rather than pressure-controlled.

As the bar hits the positive stop 69 and if the coiler 2 is clear, the guide means 68 is brought down along the pass line and, at the same time, the pinch roll 93 is brought down through the action of the cylinder 94. Also, and simultaneously, the drive rolls having the ribs 39 are again started, and the stop 69 is raised. Thus, the bar moves forward as it is being marked. When the mark is complete, as determined, for example, by rotation-sensitive means associated with the marker 96, a switch is engaged, and the marker begins to disengage, with the bar going forward toward the coiler 2. At this time, another spring bar is removed from the reheating furnace, preferably by the action of automatic equipment associated therewith, as will be understood by those skilled in the art.

The stopping of the bar into the appropriate location, with respect to the coiler 2, may be done in any of several ways, for example, by the use of distance-measuring means associated with the marker 96 or the pinch rolls 93, 94, assuming that they remain in contact with the bar until the forward end thereof is in position within the coiler 2. It is preferred, however, that the bar be moved forward by the action of the pinch rolls 93, 94 until the forward end of the bar is within about 12 inches of the mandrel 4, at which time, by means of an approach limit switch (not shown), the pinch rolls are braked, bringing the bar to an instantaneous stop. Then, when the coiler 2 is clear, as may be determined by any of a variety of suitable sensing means, and with the forward end of the bar being present as indicated by the limit switch having been tripped, there is actuated a guide which swings up in front of the chuck face, funnelwise, and there is located near the point of this guide an air-actuated switch, sensitive to back pressure, such that when the air-actuated switch is actuated as a result of having the front end of spring bar reach the end of the above-mentioned funnel-shaped guide, the pinch rolls 93, 94 disengage. Then there is actuated a dog which grips the bar. At the same time, the funnel-shaped guide is lowered, and as it passes downward, it trips another switch (not shown) to start the coiler 2.

With the leading end of the spring bar in the coiler 2, the solenoid 138 is operated to cause the pneumatic cylinder 89 to move the guide fence 68 about its pivot 82, in order to leave the trailing end of the bar free to move during coiling operation. The coiler 2 then operates to wind the spring bar on the mandrel 4, producing a compound-wound spring exhibiting degrees of pitch as determined by the design of the lead screw 6. Cylinder 106 is then operated by activation of the solenoid 192 to cause the trailing end of the spring bar to be bent down against the mandrel 4, by the action of the knockdown roll 104.

Cylinder 24 is then operated, by means of solenoids 293 and 300, to bring jaw 36 into contact with the coiled spring, at an exact location as a result of the use of the guides 57 associated with the coiler 2; and cylinder 42 is operated by means of solenoid 340 to bring movable jaw 38 resiliently but firmly into contact with the coiled spring. By deenergization of solenoids 293 and 300 and energization of solenoid 295, hydraulic cylinder 24 is made to retract transfer apparatus 28 to a suitable position, whereupon, by energization of solenoid 316, cylinder 30 is made to turn the transfer apparatus 28 about pivot 26, to bring the coiled spring into alignment with the anvil 13. Then, solenoid 295 is deenergized and solenoids 293 and 300 are energized, so as to cause hydraulic cylinder 24 to move transfer apparatus 28 downward, bringing the coiled spring into contact with the anvil 13. The guides 53 position the coiled spring accurately on the anvil 13, so that its end turns may be supported by the fingers 49, 51 against reaction forces during metal removal. The cylinders 382 and 384 are operated to bring the fingers 49, 51 into engagement with the work.

Cylinder 54 is then operated to bring saw 14 into contact with the work. To optimize metal-removal rates, the speed of travel of the saw 14 or other metal-removal means with respect to the work will not, of course, be constant throughout the metal-removal operation; rather, it will be desirable, as mentioned above, to maintain the metal-removal rate relatively constant, and to that end, it will be desirable to have the metal-removal means 14, 16 move rather slowly when a larger arc of spring is being machined and more rapidly when, as happens during the machining of the midpoint of the coiled spring, the amount of metal being removed during a given increment of forward travel of the saw 14 is substantially smaller. Moreover, with variations in the size (cross-sectional bar diameter) and length of the springs being made, etc., the desired pattern of traverse speed will change. Though equipment of several kinds could be devised to accomplish the desired variation in traverse speed in a pattern predetermined in accordance with the particular product being made, it is preferred that there be used the replaceable cam member 15 associated with the carriage 50 or other means for moving the metal-removing means 14, 16, together with the switch 3, which has a cam follower 17 and operates to change the rate of flow of hydraulic fluid in the line 212 in accordance with the position of the follower 17.

It is then necessary to cause the jaws 36 and 38 to release the spring and to withdraw the transfer apparatus 28 to a position wherein the removal of the end-finished spring from the anvil 13 is not hindered. This is done by energizing solenoid 342 to cause opening of jaw 38 by retraction of the piston of cylinder 42, energizing solenoid 295 to cause retraction of the piston of cylinder 24, and energizing solenoid 318, to cause retraction of the piston of hydraulic cylinder 30.

When the ends of the spring have been finished, either the operator or a suitable automatic device senses the temperature of the end-finished spring, and in the event that the spring is too cold to benefit properly from the ensuing quench operation, cylinder 102 is activated to turn the reject chute 98 from its normal position, shown in dot-dash lines, to the operative position, shown in solid lines, where it can act to prevent the spring, when the spring is dumped from the anvil 13, from entering the conveyor 18 that conveys the end-finished spring to the quench tank. This is done by energizing solenoid 170 to cause pneumatic cylinder 102 to retract its piston, to bring the reject chute 98 into the operative position shown.

By energization of the solenoid 158, pneumatic cylinder 48 is operated to swing anvil 13 about its pivot 46 and cause the end-finished spring to be dumped onto conveyor 18 for conveyance to a quench tank (not shown), provided that the operation of the reject chute 98 has not intervened as aforesaid.

Figure 12:
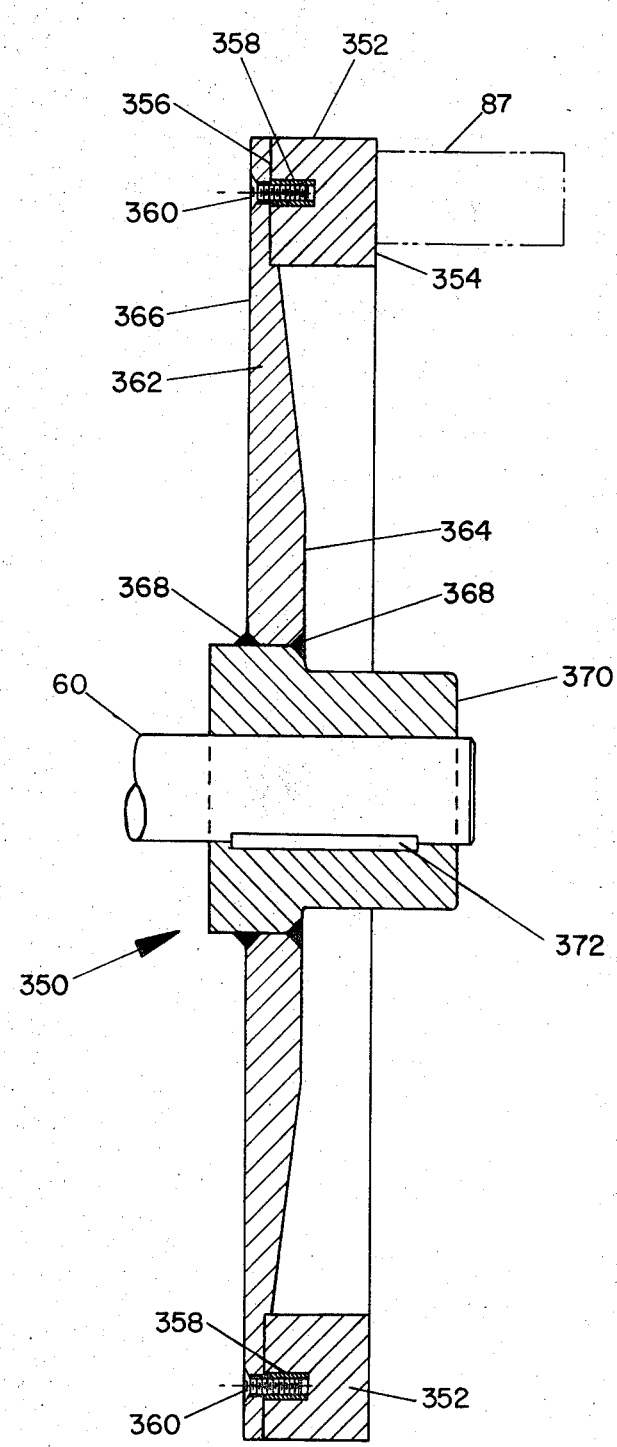
FIG 12 is a view of a grinding wheel means that may be used in place of the saw means of FIGS. 8 and 9 in the practice of the invention.

In FIG. 12, there is shown a grinding-wheel assembly 350 that may be used in place of a saw 62. This comprises a ring member 352 of abrasive material that with its surface 354 works upon the spring 87 and contains on its opposite surface 356 a number of internally threaded steel inserts 358 spaced at equal intervals which cooperate with the bolts 360 to join the ring member 352 to the plate member 362. Preferably, the plate member 362 is of slightly frustroconical shape, being somewhat thicker in the region 364 of its center than in the region 366 of its periphery, so as to have good structural rigidity. The plate member 362 is welded as at 368 to a hub member 370, which is keyed as at 372 and bolted by means, not shown, to the shaft 60. Of course, the hub 370 may be made integral with the plate member 362, and it is important that the entire assembly be properly balanced to avoid unwanted vibration. FIG. 12 shows the grinding-wheel assembly 350 in its unused condition. Those skilled in the art will appreciate that the portions of the ring member 352 nearest the periphery will initially wear the most, until a stable pattern of wear is established, but that in continued use, as a result of the passage of the grinding-wheel assembly 350 to a point with respect to the end of the spring 87 at which the spring end is sufficiently close to the shaft 60 that the inner diameter of the member 352 has passed the spring 87, a square end cut on the spring 87 is obtained, because all positions of the end of the spring 87 have been subjected to the action of the highest remaining portion of the ring member 352.

Those skilled in the art will appreciate that, whether grinding or sawing is used, the operation of the above equipment will also require the use of electrical circuitry for the energization of the above-mentioned solenoids at proper times. It is conceivable, of course, that the equipment of FIG. 11 may be operated from a control panel having buttons that may be pressed to energize desired one or ones of the above-mentioned solenoids in sequence, or that, as is more practical, an electrical system be devised based upon a cyclically operating electrical timer or the like for the performance of various parts of the operations indicated above or, for that matter, the entire operation, from grasping a hot straight bar to the quenching of the end-finished spring. Physical parameters will differ in the case of each machine made in accordance with the invention, and it is certainly within the skill of the art to devise appropriate electrical control circuitry for a particular machine, this forming no critical part of the present invention.

The present invention also has method aspects, in that it may be considered as consisting of a series of steps that may be performed, some of them by hand, or at least with the use of equipment substantially different from that taught above. In its broadest aspect, the method of the present invention involves simultaneously removing from the ends of an untapered coiled spring bar, of which at least the vicinity of the ends are substantially red-hot, i.e., about 1500–1800° F., sufficient metal to finish said coiled spring bar, i.e., to leave a pair of substantially planar end bearing surfaces thereon, while at the same time supporting the end turns of the bar against the reaction forces generated in the metal-removal operation, with the metal-removing operation being a fast-acting one that generates a swarf having a minimum temperature of about 1800° F. For metallurgical reasons, it is generally desirable that the coiled spring bar be heated throughout its length to an appropriate temperature, as discussed hereinabove. The metal removal is preferably conducted at a rate as high as possible, consonant with the objective of obtaining planar ends and considering the reaction forces generated and the yield strength of the spring metal. This method yields remakable advantages in comparison with that now practiced, not only from the considerations that the tapering operation is eliminated and the need for cold grinding some of the springs is eliminated but also from the consideration that the springs so produced are of superior quality, as will be hereinafter mentioned in connection with the article aspects of the invention. So far as the method aspects of the invention are concerned, the metal-removal operation may be done by sawing or grinding or, for that matter, by cutting or turning; the metal removal may take place either while the coiled spring is yet in place on the mandrel upon which it is formed or, as described above, upon a separate anvil so as to allow the mandrel simultaneously to be used for the winding of another spring. In place of the saw blade or grinding wheel, there may be used a fly cutter that will close in upon the coiled spring bar in the manner of a camera shutter while revolving about the spring bar. The method involves removing sufficient metal to leave flat end bearing surfaces on said coiled spring bar but not so much as to leave a feather edge, the metal-removal operation being conducted rapidly (in a total elapsed time of less than about three seconds) to obtain a satisfactory production rate. This method, as it is capable of being made completely automatic and yields results that are a great deal more uniform, and since it eliminates operator mistake in the tapering operation and in the operation of turning the trailing tapered end as a possible source of scrap loss, constitutes a substantial improvement to the art, increasing considerably the productivity of the spring-making operation.

Figure 5:
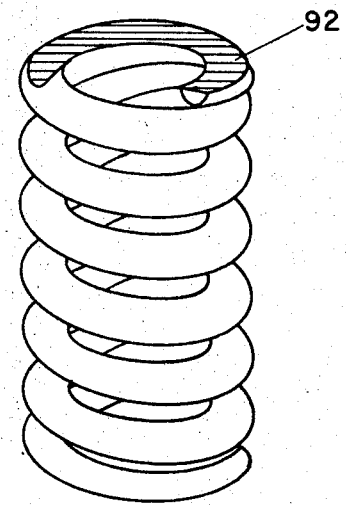
FIG. 5 is a perspective view of a spring produced in accordance with the invention.

The present invention has an article aspect, in that tests upon untapered springs hot end-finished have indicated that, in comparison with conventional truck springs with forged tapered ends, a fatigue life substantially greater is obtained. In one test, the hot end-finished springs lasted about three times as many cycles as the conventional springs with formed tapered ends. These results are obtained with a railway truck spring having substantially planar end bearing surfaces, such as the surface 92 in FIGS. 5 and 10, extending for about 210°–310° about the periphery of the spring, with the spring being made of steel of uniform properties throughout (preferably, a high-carbon spring such as Type 1095 steel), and with the spring having surfaces in the vicinity of its ends such as are obtained by the intersection of a plane with an untapered round bar that has been helically coiled. It is, accordingly, also possible, in accordance with one aspect of the invention, to make such articles by grinding the red-hot ends of spring bars that have been pretapered to reduce grinding-wheel wear.

While there have been shown and described herein certain embodiments of the invention, it is intended that there be covered as well any change or modification therein which may be made without departing from the spirit and scope of the invention.

We claim as our invention:

1. Apparatus for finishing the ends of a railway truck spring, said apparatus comprising, in combination, a mandrel about which is coiled a red-hot spring, a pair of cooperating jaws for removing said spring from said mandrel to an anvil, one of said cooperating jaws being provided with resilient means for adapting said jaws securely to grasp coiled springs having varying degrees of taper, and means for simultaneously removing metal from both ends of said spring so as to leave thereon substantially planar end bearing surfaces extending for about 210°–310° about the periphery of said spring, said metal-removing means producing a swarf having a minimum temperature of about 1800° F.

2. Apparatus as defined in claim 1, further characterized by means associated with said jaws and adapted to cooperate with means associated with said coiler and said anvil for guiding said jaws repeatedly to predetermined locations with respect to said mandrel and said anvil.

3. Apparatus as defined in claim 1, further characterized in that said anvil supporting said spring bar during said metal-removal operation comprises means supporting the end turns of said coiled spring bar so as to prevent them from moving axially of said spring bar as a result of compressive reaction forces generated during the metal-removing operation.

4. Apparatus as defined in claim 3, characterized in that said means for supporting the end turns of said coiled spring bar so as to prevent them from moving axially of said spring bar comprise a pair of fingers located on said anvil.

5. Apparatus as defined in claim 3, characterized in that said means for simultaneously removing metal from both ends of said red-hot coiled spring bar comprise a pair of grinding wheels.

6. Apparatus as defined in claim 5, characterized in that each of said grinding wheels has a central portion which is recessed so as to remain out of contact with said red-hot coiled spring bar during a metal-removal operation.

7. Apparatus as defined in claim 4, characterized in that said means for simultaneously removing metal from both ends of said red-hot coiled spring bar comprise a pair of saws having blades with a diameter of at least about 24 inches.

8. Apparatus as defined in claim 7, further characterized in that said apparatus also comprises first and second flanges positioned on opposite sides of each of said saw blades, each of said first flanges being larger than each of said second flanges, each of said first flanges being positioned on the side of the saw blade remote from the body of the coiled spring bar being end-finished, each of said flanges having in contact with its associated saw blade at least two tapered lands, and each pair of flanges cooperating with a hydraulic nut provided with a ring bearing on one of said flanges so as to impart to said saw blade when not in contact with the work in a metal-removal operation a contour dished concavely by 0.004 to 0.007 inch per inch of saw-blade diameter when viewed from the body of said red-hot coiled spring bar.

9. Apparatus as defined in claim 3, further characterized in that said means for simultaneously removing metal from both ends of a red-hot coiled spring bar comprises means for controlling the rate of traverse of the metal-removal means with respect to said spring bar so as to maintain substantially constant during the metal-removal operation the quantity of metal removed per unit of time.

References Cited

UNITED STATES PATENTS

| | | | |
|---|---|---|---|
| 716,679 | 12/1902 | Daniels et al. | 83—907X |
| 2,018,209 | 10/1935 | Gogan | 72—134X |
| 2,691,416 | 10/1954 | Williams et al. | 83—907X |
| 3,186,272 | 6/1965 | Kaufmann | 83—907X |

MILTON S. MEHR, Primary Examiner

U.S. Cl. X.R.

72—134, 173; 83—907